June 21, 1949.  A. VANG  2,473,772
ELECTRIC STORED ENERGY RESISTANCE WELDING SYSTEM
Filed March 2, 1945  4 Sheets-Sheet 1

INVENTOR.
ALFRED VANG.
BY
ATTORNEY.

June 21, 1949. A. VANG 2,473,772
ELECTRIC STORED ENERGY RESISTANCE WELDING SYSTEM
Filed March 2, 1945 4 Sheets-Sheet 2

INVENTOR.
ALFRED VANG.
BY Peter M. Borsery
ATTORNEY.

INVENTOR.
ALFRED VANG.

June 21, 1949.  A. VANG  2,473,772
ELECTRIC STORED ENERGY RESISTANCE WELDING SYSTEM
Filed March 2, 1945  4 Sheets-Sheet 4
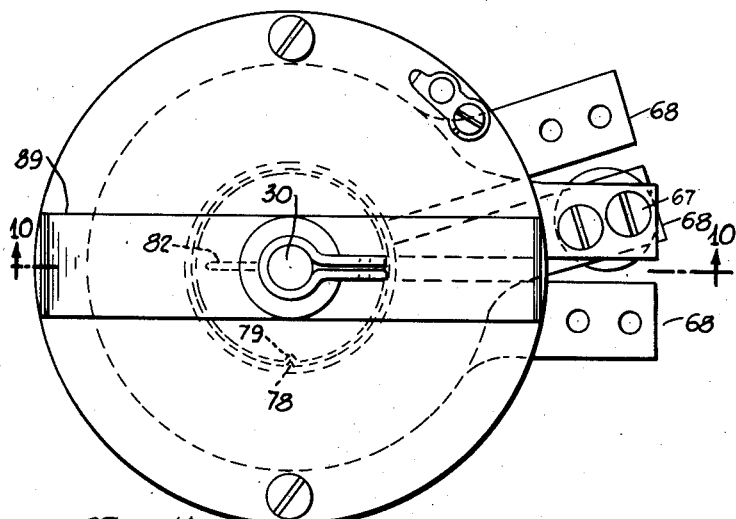
Fig. 11.
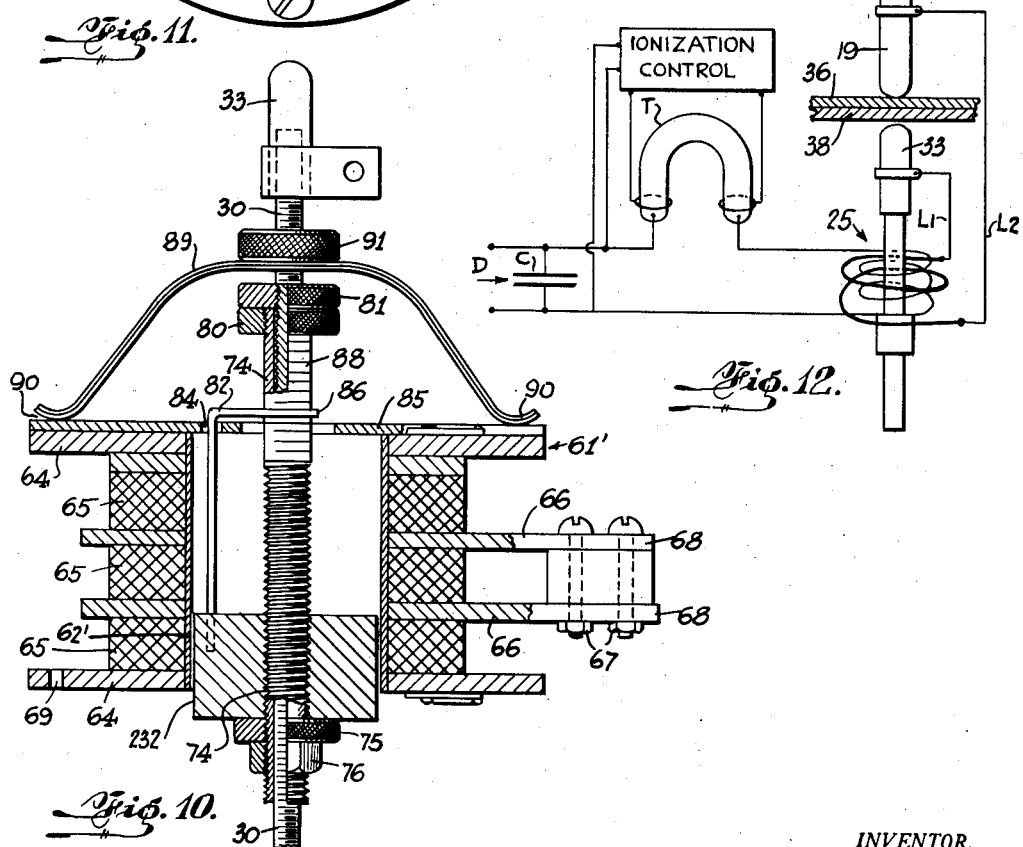
Fig. 12.
Fig. 10.
INVENTOR.
ALFRED VANG.
BY
ATTORNEY.

Patented June 21, 1949

2,473,772

UNITED STATES PATENT OFFICE 2,473,772

ELECTRIC STORED ENERGY RESISTANCE WELDING SYSTEM

Alfred Vang, New York, N. Y.

Application March 2, 1945, Serial No. 580,648

16 Claims. (Cl. 219—4)

This invention relates to new and useful improvements in the resistance welding systems in which electric energy is stored in a condenser and then discharged through a transformer having a minimum of magnetic material in the magnetic flux circuit or no such material at all.

In resistance welding systems in which electric energy is stored in a condenser and then discharged through the conventional iron core transformer there is often a relatively long period of decay of the current. This relatively long period required for the decay of the current limits the speed with which successive welding operations may be made. If the welding electrodes are separated from the work which they are welding while any current is still flowing through the welding load, sparking and sputtering of the electrode material on the work may occur with consequent damage to the work. For these and various other purposes it is often desirable to stop the current flow in the welding load in a shortened period of time.

In systems of the type hereinabove described elaborate and costly circuits and means are now commonly employed to terminate the decay current in the load circuit in a shortened period of time.

In systems of the type as hereinabove described, particularly where each pulse of current supplied to the primary winding of the welding transformer has a considerable direct current component, the problem of saturation of the transformer core becomes particularly troublesome. To prevent such saturation it has been necessary to use a relatively large amount of core material. A large amount of core material increases the direct current component and lengthens the decay current time in the load circuit.

Thus an object of this invention is to eliminate core material or to reduce the amount thereof to such a degree that the time required for the current to decay to zero is considerably shortened.

Another object of the present invention is the provision of a welding transformer for stored energy systems of resistance welding which due to omission of a magnetic material in the magnetic flux circuit or the use of a minimum amount of magnetic core, offers so little impedance to the welding current in the load circuit that the greatest benefit of the oscillatory high frequency current discharge of the stored energy condenser is obtained.

Heretofore such high frequency oscillatory welding current discharges could not be utilized to their full advantage in stored energy resistance welding systems due to the fact that conventional tubes when used for the discharge switch are liable to "flash back" or conduct in the wrong direction if reverse potential appears before the gas is completely de-ionized.

The "flash back" causes the anode to disintegrate and may damage the tube irreparably. To overcome this difficulty elaborate and costly circuits have been used to prevent the reverse potential appearing in the tube.

To eliminate this difficulty and to utilize the advantages of high frequency currents for resistance welding, as stated in my Patent 2,287,544, June 23, 1942, and my Patent 2,287,540, June 23, 1942, I devised a special discharge tube, Patent 2,287,541, June 23, 1942, in which one of the objects of the invention was to provide a switching means for high frequency circuits.

An object of this invention is to provide a transformer which will operate with the greatest efficiency and utilize and embody the advantages of my patents hereinbefore stated.

A further object of the present invention is to provide an improved device or apparatus for applying a forging electrode pressure to the weld in timed relation to the flow of the welding current.

A still further object of the invention is to provide an improved device or apparatus which does not require any special timing mechanism or elaborate electronic circuits for the application of forging pressure and welding current.

Other objects of the invention are to provide an improved welding transformer constructed in the form of a solenoid with a co-operating magnetic material armature, with the welding current in the transformer actuating the armature so as to place a welding forging pressure on the electrodes. This pressure is adjustable and is controlled by regulating the position of the magnetic armature within the welding current induced magnetic field in the welding transformer.

Heretofore in welding, the timing of the application of forging pressure on work pieces with respect to the flow of welding current through the work pieces has necessitated many elaborate tuned and timed electrical, air or hydraulic devices. This has been especially necessary in welding devices where the period of heating has been of short duration so as to prevent crystallization of the weld.

Devices have been tried utilizing electromagnetic pressure produced by the welding current, but they have not been successful due to the fact that they involve the attraction of an armature by an electromagnet so that as the armature approaches the magnet the attraction or electrode pressure, according to the inverse square of the distance law, increases until frequently the weld is punched out.

To overcome this objection I have constructed the welding transformer in the form of a solenoid utilizing the welding current as the means of attracting the armature. The armature is partially disposed within the solenoid transformer, sufficiently distant from the neutral plane thereof, so that the desired forging pressure for that particular weld is obtained.

I have found that a welding transformer employing such an arrangement produces exceptionally good results, presumably due to the natural time lag between the melting of the work pieces and the application of the forging pressure. I have also found that there is a saving of electric energy as in many cases a lower potential voltage will yield as good or even better results when using magnetic forging pressure than a higher potential without this pressure, with the same condenser bank, would do. Furthermore, as higher voltages are required for certain welds, which require higher forging pressures, the forging pressure is automatically increased by the larger amount of current in the solenoid transformer.

In the accompanying drawing showing, by way of example several of many possible embodiments of the invention:

Figure 10 is a fragmental transverse vertical sectional view, partly in elevation, showing another form of the transformer; the section being taken substantially on the line 10—10 of Figure 11, looking in the direction of the arrows of said line.

Figure 11 is a plan view of the transformer of Figure 10; and

Figure 12 is a schematic wiring diagram showing a mode for operating the welder.

Figure 1:
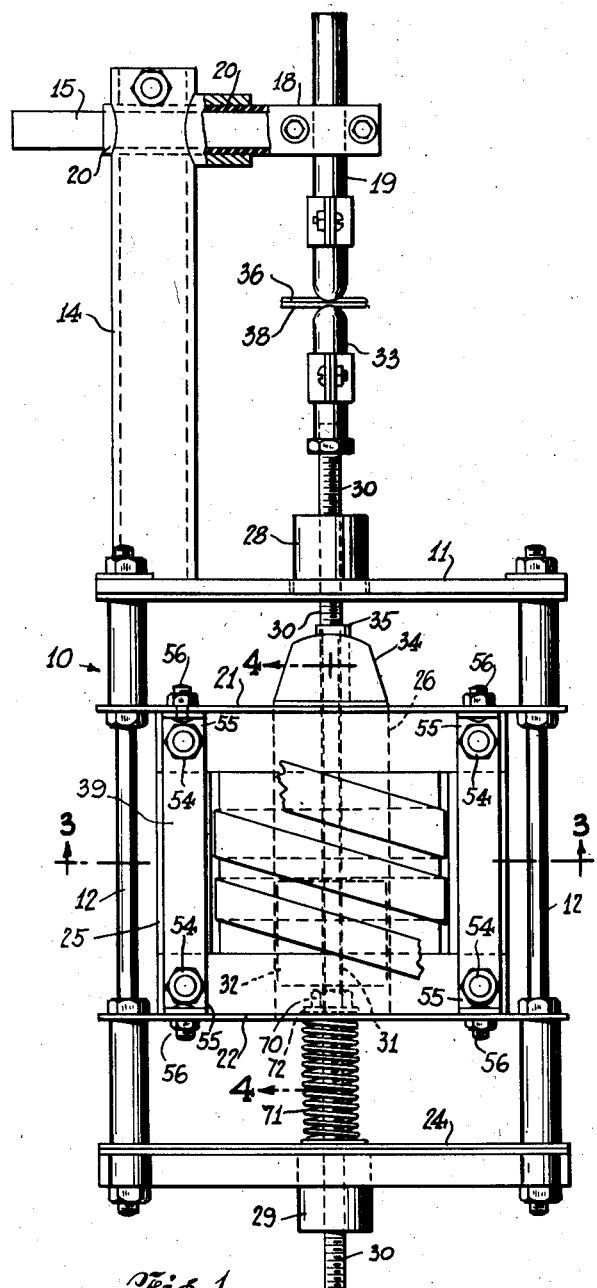
Figure 1 is a side elevation, showing the welder.
Figure 2:
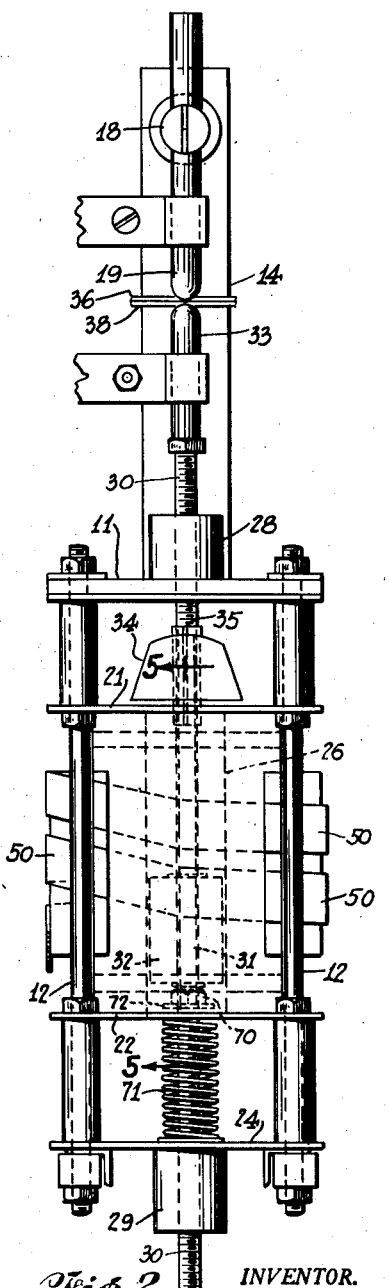
Figure 2 is an end elevation, showing the welder of Figure 1.
Figure 3:
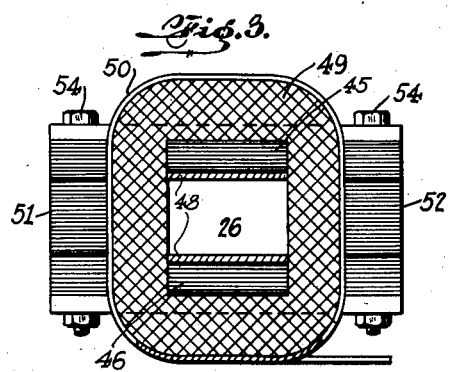
Figure 3 is a transverse horizontal sectional view, showing the transformer; the section being taken substantially on the line 3—3 of Figure 1, looking in the direction of the arrows of said line.
Figure 4:
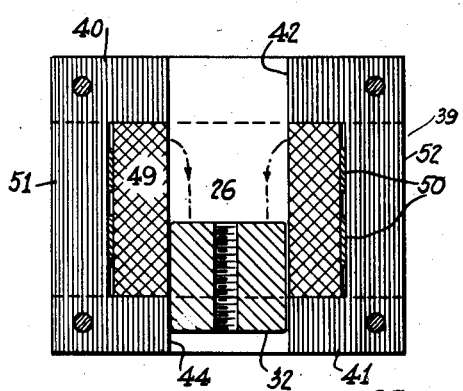
Figure 4 is a vertical sectional view, showing the transformer and armature; the section being taken substantially on the line 4—4 of Figure 1, looking in the direction of the arrows of said line.
Figure 6:
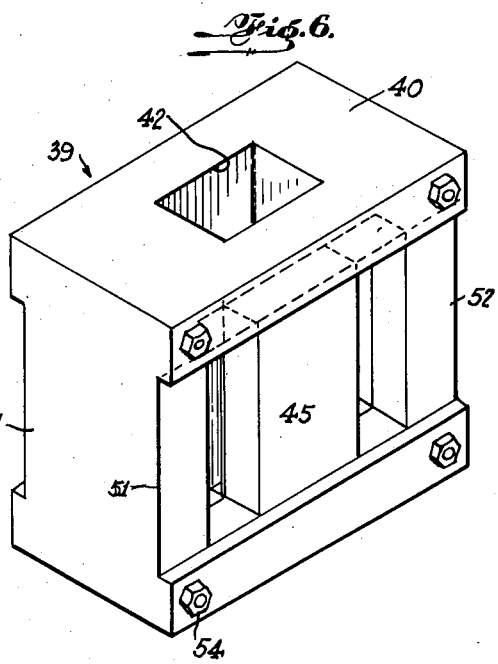
Figure 6 is a perspective of the core frame of the transformer.
Figure 5:
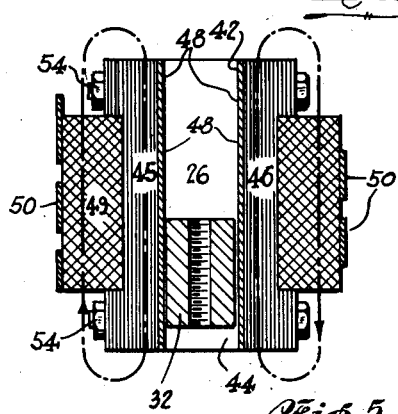
Figure 5 is a transverse vertical sectional view, showing the transformer and armature; the section being taken substantially on the line 5—5 of Figure 2, looking in the direction of the arrows of said line.

The welder, as shown in Figure 1, comprises a table-like frame structure 10, having a top 11 supported by four corner legs formed by tie-bolts 12. A column 14 rises from one of the marginal portions of the top and carries an electrode holder 15 on the upper end of the column and has a clamp 18 at the other end adapted to overhang the center of the top 11. A pending vertical electrode 19 is clamped in said overhanging end and is preferably insulated from the structure by suitable means such as an insulating sleeve 20. Upper, intermediate and bottom shelf-like platforms 21, 22, and 24 are horizontally mounted on said legs 12, under said top 11 and spaced from each other so as to form a sturdy structure. A transformer 25 is mounted on and between the upper and intermediate platforms 21 and 22 and is provided with a vertical passageway or well 26 of rectangular cross section and axially alined with said electrode 19. An upwardly projecting boss 28 rises from said top 11, and a downwardly projecting boss 29 pends from the bottom platform 24, each of said bosses being provided with openings axially alined with the well 26 and electrode 19. A vertical reciprocatory brass rod 30 passing through the well freely slides in said boss openings.

The rod 30 is provided with threads 31 throughout its mid-portion or its entire length onto which is threaded an armature or plunger 32 of rectangular cross-section vertically slidable in the well 26. The armature may be of any suitable material, but compressed powdered iron has been found especially good. The plunger 32 normally operates within the lower half of the well 26 and its position therein can be adjusted by rotation of the rod 30. Rotation of said rod is accomplished by an adjusting nut 34 thinner than the space between the top 11 and upper platform 21. The rod 30, which is free to slide through the nut 34 is provided with a key 35 which engages a keyway in nut 34. An electrode 33 is mounted on the upper end of the rod and is adapted to cooperate with the upper electrode 19 against work pieces 36, 38.

The transformer 25, as shown in Figure 1, comprises a core frame 39 (Figures 3, 4, 5, and 6), having upper and lower rectangular horizontal yoke portions 40, 41 provided with alined rectangular openings 42, 44 and upright magnet cores 45, 46 at each end of the frame, said cores having a width equal to the length of the openings 42, 44 and are joined to the yoked portions and terminating inwardly at the vertical planes of the openings to form side walls of the well 26. The well walls may be lined with magnetic shielding material such as brass, as at 48. A primary winding 49 of some 300 turns of No. 16 wire is wound about the two magnet cores 45, 46, the wire coil forming the end walls of the well so that no iron exists on two sides of the well to retard the decay of the flux thereat; a secondary winding of about two turns of copper strip 50 is wound about the primary. Two upright flux conducting end portions 51, 52 join the respective end portions of the yokes to complete the flux circuit exterior of the two windings. The core frame 39 is preferably made of laminated sheets stacked from side to side of the frame and clamped by transverse bolts 54, the latter also mount brackets 55 secured to the upper and intermediate platforms by bolts 56.

Figure 7:
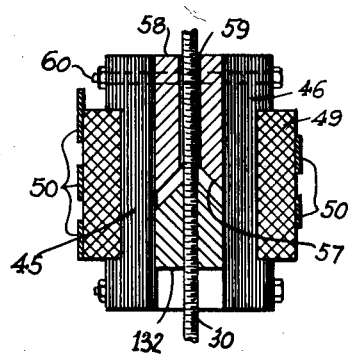
Figure 7 is a transverse vertical sectional view, partly in elevation, showing a modification of the transformer of Figure 5.
Figure 9:
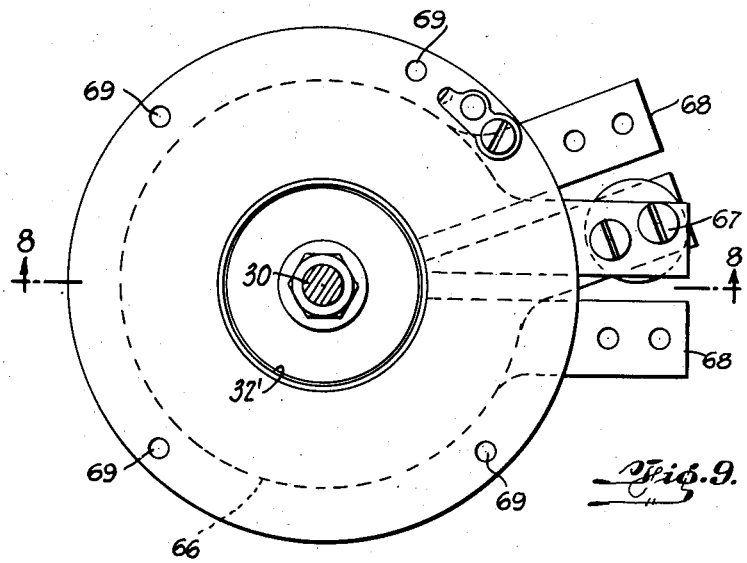
Figure 9 is a plan view of the transformer of Figure 8.
Figure 8:
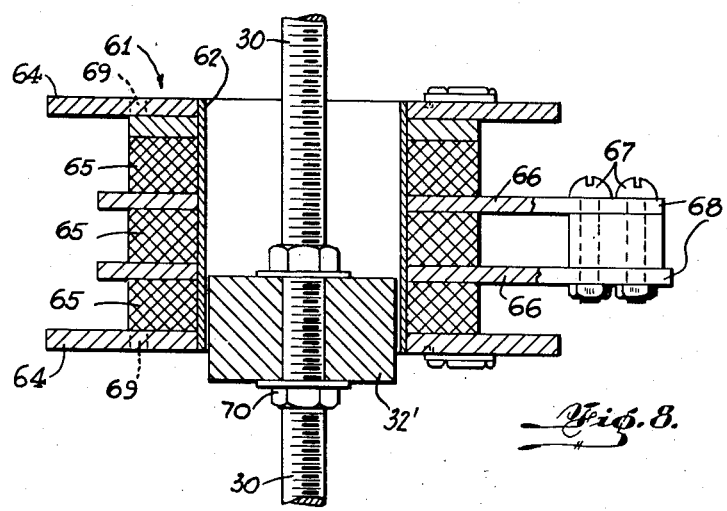
Figure 8 is a fragmental transverse vertical sectional view, partly in elevation, showing another form of the transformer; the section being taken substantially on the line 8—8 of Figure 9, looking in the direction of the arrows of said line.

If extremely great and increasing welding pressures are desired, as the electrodes approach each other, an iron plug 58 having a smooth vertical bore 59, through which the rod 30 passes, may be inserted in the upper part of the well and secured by bolts 60, as shown in Figure 7. Such an arrangement is similar to magnetic pressure means heretofore in use, and the plunger 132 and plug 58 may be shaped in any suitable manner, such as a pointed plunger adapted to enter a recess 57 in said plug.

Instead of the iron core transformer, an air core transformer 61 may be substituted, which I have found to give excellent results when current frequencies of the order of 1000 and even 3000 and higher cycles per second were used. Tests show that welds of greater area are obtained from the same amount of energy by the use of the air-core transformer with magnetic forging electrode pressure than by the use of the conventional iron core transformer; and I have found that in welding of certain materials, frequencies of 250 cycles per second give the best results. The air core transformer 61 comprises a tube 62 of suitable non-magnetic material, such as Bakelite, provided with end flanges 64 between which three coils 65, of some 72 turns of No. 14 wire each, are wound on the tube and connected in series to form a primary winding. Two split flat rings 66 of heavy copper are disposed intermediate the first and second coils and the second and third coils, respectively, and connected in series by means of bolts 67 passing through terminal extension 68 provided at the ends of the rings to form a secondary winding. The transformer 61 may be mounted on the platforms 21, 22 by means of bolts 56 passing through holes 69 in the flanges, so that a solid substantially cylindrical armature plunger 32' slidable in the tube and mounted on the rod 30, may actuate the rod and electrode 33.

With either type of transformer the rod 30 is preferably provided with an adjusting nut 70 thereon below the plunger. A helical spring 71 about the rod is compressed between the platform 24 and the nut 70 or a washer 72, adjacent thereto to constantly urge the rod upwardly both to furnish initial pressure for resistance welding on the work pieces in cooperation with the upper electrode, and to hold the work pieces together during the formation of hot gases between the work pieces.

Work pieces 36, 38 are inserted between the electrodes after the rod 30 has been lowered against the pressure of the spring in any suitable manner, such as by a foot pedal (not shown) attached to the lower end of the rod. Another form of air-core transformer, generally designated as 61', is shown in Figure 10 and is identical with the transformer 61 in respect to the primary and secondary windings. The rod 30 is threaded substantially over its entire length and is disposed coaxially with the upper electrode, as in Figure 1. However, the cylindrical plunger 232 is not threaded directly onto the rod 30 but onto an externally threaded smoothly-bored tube 74 rotatable on the rod. Downward movement of said tube is limited by an adjusting nut 75 and a locking nut 76 threaded onto said rod so that as the tube is rotated about the rod the plunger will ascend or descend on the tube 74. The transformer core tube 62' is preferably provided with an internal longitudinal rib 78 loosely engaged in a longitudinal groove 79 in the plunger 232 to prevent rotation thereof.

The upper end of the rotary tube 74 projects well above the transformer and is provided with a knurled head 80 fast thereon and which is secured against upward movement relative to the rod 30 by means of a locking nut 81 threaded onto said rod.

An indicator rod 82 is mounted fast on the upper face of the plunger 232 and rises therefrom up through a hole 84 in an annular sheet 85 disposed on the flange 64. The outer end portion of the indicator is bent at a right angle and developed as a loop or ring 86 about the threaded tube 74 which is smooth at the upper end and provided with indicia 88. Thus the position of the plunger within the transformer can be ascertained at any time since the nuts 75, 76 and 81 prevent relative movement of the rod 30 and tube 74.

The electrode and rod 30 are urged upwardly by means of a bow spring 89 arched over the top sheet 85 which the spring engages at its ends 90, the upper portion of the rod above the lock nut 81 passing through the mid portion of the spring. An adjusting nut 91 threaded onto the rod above the spring, is adjusted to give a suitable initial pressure between the electrodes.

The transformer of Figure 10 may be mounted on the platform 22 of Figure 1 and if desired the platform 21 may be omitted. The top 11 may also be omitted and the column 14 mounted on the platform 22 or any other suitable part of the structure 10.

The welder in any of its modifications is energized by stored energy, as shown schematically in Figure 12, wherein a capacitor C is charged by a suitable source of direct high voltage current D. The capacitor is discharged through the primary of the transformer 25, the characteristics of the discharge such as frequency and duration being controlled by a discharge tube described in my U. S. Patent No. 2,287,541.

The thickness of the work pieces will automatically affect the forging pressure applied to them, for if the pieces are thick the plunger will be far removed from the neutral plane of the solenoid, and the magnetic force great. Conversely, if the pieces be thinner, the spring 71 or 89 will insure the plunger being nearer the neutral plane, where the magnetic force will be much less.

Terminal connections to the primary windings and leads $L_1L_2$ from the ends of the secondary to the electrodes may be provided in any suitable manner.

In operation the ionization control is set to afford a flow of stored electrical energy through the primary winding of the transformer at the desired frequency. The flow of this current can be terminated most abruptly by means of the control and tube or switch T. In another mode of operation, the inductance, capacity and resistance of the primary circuit are predetermined and set to afford a flow of stored electrical energy through the primary winding of the transformer at the desired frequency. The rare magnetic field of the transformer collapses substantially instantaneously with the stoppage of the primary current so that no residual current flows in the secondary or through the weld. Consequently the electrodes may be removed immediately without danger of sparking.

Since all the moving parts of the welder are light in weight, all variations in the welding current are reflected substantially simultaneously as variations in the electrode or forging pressure. The combined weight of all moving parts used with the transformer, as described, is about ½ lb. The inherent lag of movement of these parts results in a forging pressure being applied at the proper time for good forging of the weld. If the armature is too massive, the pressure is delayed too greatly, which most often causes a defective weld, and perhaps a punching out of a hole if the work pieces are thin. Thus it is seen that the mass of armature, and, of course, the nature of its material, determines the phase relationship between the wave form of the pressure and that of the welding current.

If the spring means is so adjusted that the initial contact of the electrodes on the work pieces or the contact between the work pieces themselves is imperfect or there is an oxide insulating film between the work pieces the flow of the secondary current may be retarded so as to lag the pressure exerted by the armature. With certain types of material to be welded such a lag in current may be desirable.

Thus it is seen that in my welder, the application of electrode or forging pressure may either lag or lead the welding current, depending on the adjustment of the spring pressure. Obviously, by careful adjustment of the spring pressure, changes in electrode pressure may be synchonized with the welding current.

My welder is adapted to operate on high frequency current, which I define for reference herein, as above about 60 cycles per second.

It is obvious that slight changes may be made in the form, construction and arrangement of the several parts, as shown, within the scope of the appended claims, without departing from the spirit of my invention, and I do not, therefore, wish to limit myself to the exact construction and arrangement shown and described herein.

Having thus described my invention, what I claim as new and desire to secure by Letters Patent of the United States, is:

1. A system for resistance welding including a welder having opposed electrodes, a pair of solenoids associated to form a transformer, an armature in one of the solenoids for urging the electrodes together, the secondary of the transformer being adapted to supply a resistance welding current to the electrodes, and the primary being connected to an abruptly interceptible source of current, the only iron in the transformer being the armature.

2. A welder comprising a mounting structure having a fixed electrode arranged thereon, a pair of solenoids mounted on said structure, one of said solenoids being the primary of a transformer, an armature in one of the solenoids and a movable electrode actuated thereby to cooperate with the fixed electrode, the secondary of the transformer being adapted to supply a resistance welding current to the electrodes, the only iron in the transformer being the armature, whereby the decay of the flux and current is rapid, and the electrodes may be quickly removed from work pieces without danger of sparking.

3. In combination, two coaxial solenoid coils one about the other to form a transformer, an armature within the solenoid and remote from the neutral plane thereof so that when the solenoid is energized the armature will move toward the neutral plane, a pair of opposed welding electrodes electrically connected to one of said coils, and means mounted on the armature and on one of the electrodes for moving the electrodes together as the armature moves toward said neutral plane.

4. A welder comprising two opposed electrodes one of which is movable toward the other, a transformer the secondary winding of which is connected to the electrodes, said transformer having a passageway magnetically open at each end through one of the coils, and a movable armature in said passageway and mounted on the movable electrode, and normally remote from the magnetic equator of the coil therearound, whereby when the transformer is energized, the armature will move toward the equator and urge the electrodes together, and a current flow through the electrodes.

5. A welder comprising mounting means, an upper electrode pending from said means, a solenoid having a vertical well open at each end and substantially in axial alinement with the electrode and mounted on said means and under the electrode, a vertical reciprocatory rod slidably mounted on said means and alined with the electrode and passing through the well, a vertically slidable armature plunger in the lower part of the well and mounted on said rod, means for attaching the plunger securely to the rod, and an electrode mounted in the upper end of said rod and adapted to cooperate with the upper electrode against work pieces.

6. A welder, as claimed in claim 5, and wherein said means is an externally threaded tube rotatably disposed about the rod and threaded into the plunger, and means for preventing longitudinal movement of the tube on the rod.

7. A welder comprising a table-like frame structure having a top and four corner legs, a column rising from one of the marginal portions of the top, an electrode mounted on the column and overhanging the top, upper and lower platforms horizontally mounted on said legs under said top and spaced from each other, a transformer comprising a vertical tube of insulating material under the electrode and provided with end flanges, one flange being mounted on the upper platform and the other flange on the lower platform, a few coils of wire each wound on the tube and connected in series as a primary winding, split flat rings of heavy copper intermediate the coils and provided with extensions at the ends of said rings, the rings being connected in series whereby to form a secondary winding, movable means for mounting a movable electrode, and an armature within the tube for actuating said means.

8. In combination, an air-core transformer having a well therethrough, said transformer comprising an open tube of insulating material and provided with end flanges, coils of wire each wound on the tube and connected in series as a primary winding, split flat rings of heavy copper intermediate the first and second coils and the second and third coils, respectively, and provided with extensions at the ends of the rings, said rings being connected in series whereby to form a secondary winding, an electrode in substantially fixed relationship to the transformer and an opposed reciprocatory electrode, an armature in the tube and remote from the magnetically neutral plane thereof, means for transmitting motion of the armature to the reciprocatory electrode, resilient means for urging the electrodes together when no current flows through the windings, and leads electrically connecting the secondary winding to the electrodes.

9. An electric welder comprising electrodes of which one is movable, a carrier for said movable electrode, an adjustable sleeve on said carrier comprising a solenoid core, a solenoid coil around said core, a source of current, means for making and breaking connection between said source of current and the coil, slidable means supporting said carrier and movable electrode, and means for maintaining the said slidable means, carrier and movable electrode normally at the position from which magnetic flux in said coil will impel the core, slidable means and movable electrode.

10. In combination, two coaxial solenoid coils one about the other to form a transformer, an armature within one of the solenoid coils and remote from the neutral plane thereof, a pair of opposed welding electrodes electrically connected to the terminals of one of said coils, and means mounted on the armature and on one of the electrodes for relatively moving the electrodes together as the armature moves toward said neutral plane.

11. A system for resistance welding including a welder having opposed electrodes one of which is movable, a pair of solenoid coils associated to form a transformer, an armature movable in one of the coils, and means for transmitting motion of the armature to the movable electrode, the terminals of the secondary of the transformer being respectively connected to the electrodes.

12. In a welder, primary and secondary coils associated to form a transformer, a rod substantially in axial alinement with one of the coils, and surrounded thereby, a welding electrode on the rod, and a solenoid armature core on the rod close enough to one of said coils to be impelled by magnetic flux developed by the coil.

13. In a welder, primary and secondary coils associated to form a transformer, a rod surrounded by one of said coils, a welding electrode on the rod, and a solenoid core on the rod and within one of said coils.

14. In a welder, primary and secondary coils associated to form a transformer, a movable armature in one of the coils, a movable welding electrode, and means for transmitting motion of the armature to the electrode.

15. In a welder, two welding electrodes one of which is movable, primary and secondary coils associated together to form a transformer, the terminals of the secondary coil being connected respectively to the electrodes, an armature within one of said coils and adapted to move relative thereto, and means for transmitting motion of the armature to the movable electrode.

16. In a welder, two welding electrodes one of which is movable, primary and secondary transformer coils, a rod passing through the coils and carrying the movable electrode, and an adjustable sleeve on the rod comprising a solenoid armature, the electrodes, rod, coils and solenoid being coaxial.

ALFRED VANG.

REFERENCES CITED

The following references are of record in the file of this patent:

UNITED STATES PATENTS

| Number | Name | Date |
| --- | --- | --- |
| 245,591 | Westinghouse | Aug. 9, 1881 |
| 1,078,675 | Heany | Nov. 18, 1913 |
| 1,168,346 | Thomson | Jan. 18, 1916 |
| 1,327,792 | Thornton | Jan. 13, 1920 |
| 1,674,670 | Taylor | June 26, 1928 |
| 1,976,552 | Friesen | Oct. 9, 1934 |
| 2,089,213 | Labodie | Aug. 10, 1937 |
| 2,333,448 | Seeley | Nov. 2, 1943 |